United States Patent
Kaimoto

(10) Patent No.: US 9,170,005 B2
(45) Date of Patent: Oct. 27, 2015

(54) STAND FOR STROBE AND ILLUMINATION DEVICE EQUIPPED WITH SAME

(71) Applicant: Panasonic Corporation, Osaka (JP)

(72) Inventor: Minenori Kaimoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/380,764

(22) PCT Filed: Feb. 25, 2013

(86) PCT No.: PCT/JP2013/001044
§ 371 (c)(1),
(2) Date: Aug. 25, 2014

(87) PCT Pub. No.: WO2013/128868
PCT Pub. Date: Sep. 6, 2013

(65) Prior Publication Data
US 2015/0022992 A1    Jan. 22, 2015

(30) Foreign Application Priority Data

Feb. 28, 2012 (JP) ................................ 2012-041654

(51) Int. Cl.
| G03D 13/00 | (2006.01) |
| F21V 21/06 | (2006.01) |
| G03B 15/03 | (2006.01) |
| G03B 17/56 | (2006.01) |
| F21V 21/092 | (2006.01) |
| F21V 21/14 | (2006.01) |
| F21W 131/30 | (2006.01) |

(52) U.S. Cl.
CPC ............... *F21V 21/06* (2013.01); *F21V 21/092* (2013.01); *F21V 21/14* (2013.01); *G03B 15/03* (2013.01); *G03B 17/561* (2013.01); *F21W 2131/30* (2013.01); *G03B 2215/0517* (2013.01)

(58) Field of Classification Search
USPC ......... 396/56, 155, 661, 422, 174; 248/185.1, 248/187.1; 362/200, 370–372
See application file for complete search history.

(56) References Cited

U.S. PATENT DOCUMENTS 2,892,927 A * 6/1959 Rosenblum .................. 396/174
3,312,086 A * 4/1967 Casebeer et al. ................ 431/14
(Continued)

FOREIGN PATENT DOCUMENTS

JP    H4-130937     12/1992
JP    07-209707 A    8/1995
(Continued)

OTHER PUBLICATIONS

International Search Report for PCT/JP2013/001044 mailed May 28, 2013.

*Primary Examiner* — Clayton E Laballe
*Assistant Examiner* — Warren K Fenwick
(74) *Attorney, Agent, or Firm* — RatnerPrestia

(57) ABSTRACT

Strobe stand on which strobe device is mounted is provided. Strobe device includes strobe body and light-emitting housing coupled to strobe body. The strobe stand includes the following elements: base plate having leg; attachment section provided on one surface of base plate for receiving strobe device; and suction pad provided on leg on the other surface of base plate. With this configuration, the bounce angle of light-emitting housing of strobe device can be positioned accurately.

8 Claims, 10 Drawing Sheets

(56) References Cited

U.S. PATENT DOCUMENTS

| | | | | |
|---|---|---|---|---|
| 3,616,733 A | * | 11/1971 | Morse | 362/15 |
| 3,869,604 A | * | 3/1975 | Prochnow | 362/4 |
| 3,917,944 A | * | 11/1975 | Eisenberger et al. | 250/239 |
| 2001/0012455 A1 | * | 8/2001 | Mulcahy et al. | 396/419 |
| 2003/0196358 A1 | * | 10/2003 | Fratzke | 40/597 |
| 2009/0097835 A1 | * | 4/2009 | Kunishige et al. | 396/56 |
| 2014/0099093 A1 | * | 4/2014 | Johnson et al. | 396/428 |

FOREIGN PATENT DOCUMENTS

| | | |
|---|---|---|
| JP | 2008-158233 A | 7/2008 |
| JP | 2011-170014 A | 9/2011 |

* cited by examiner

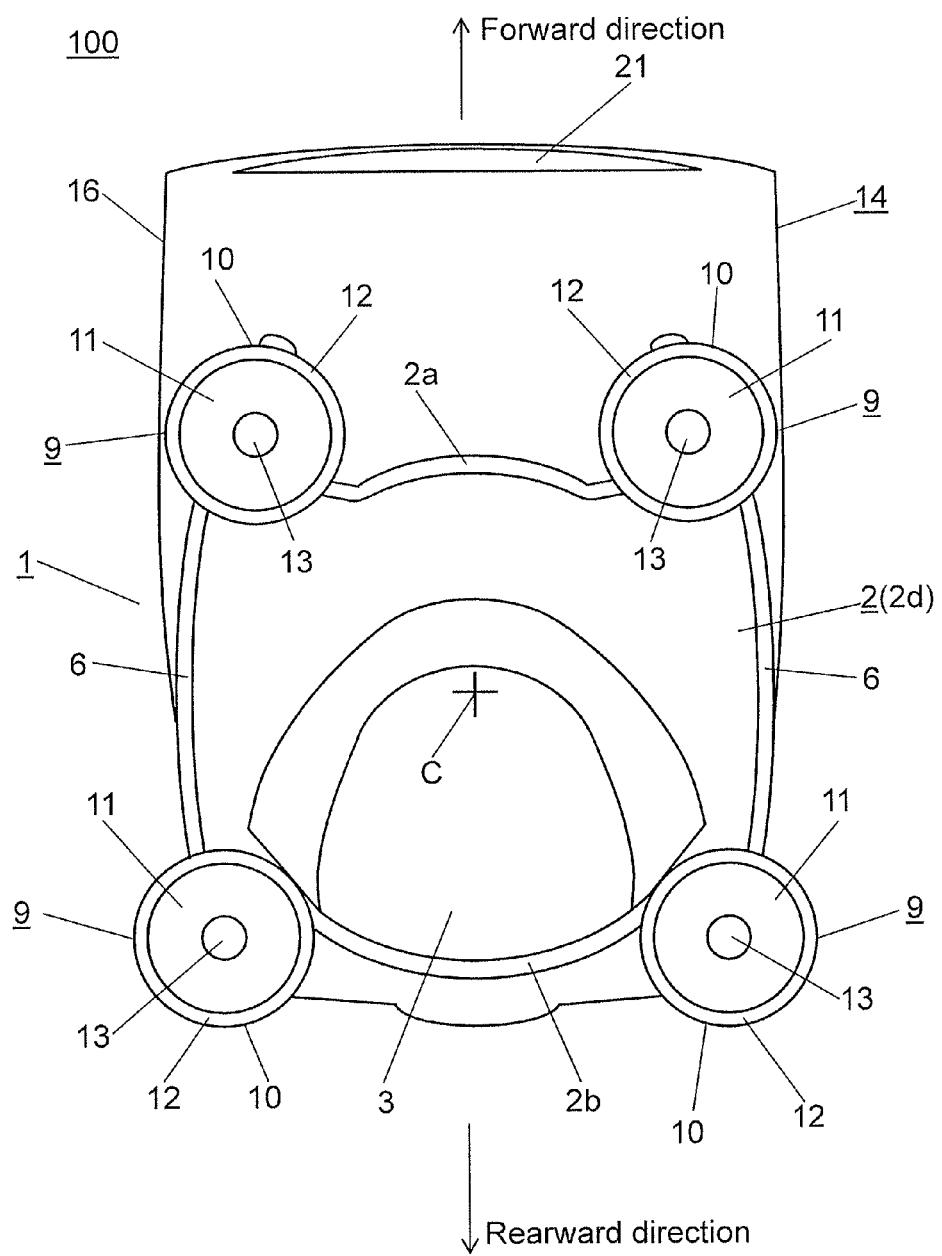

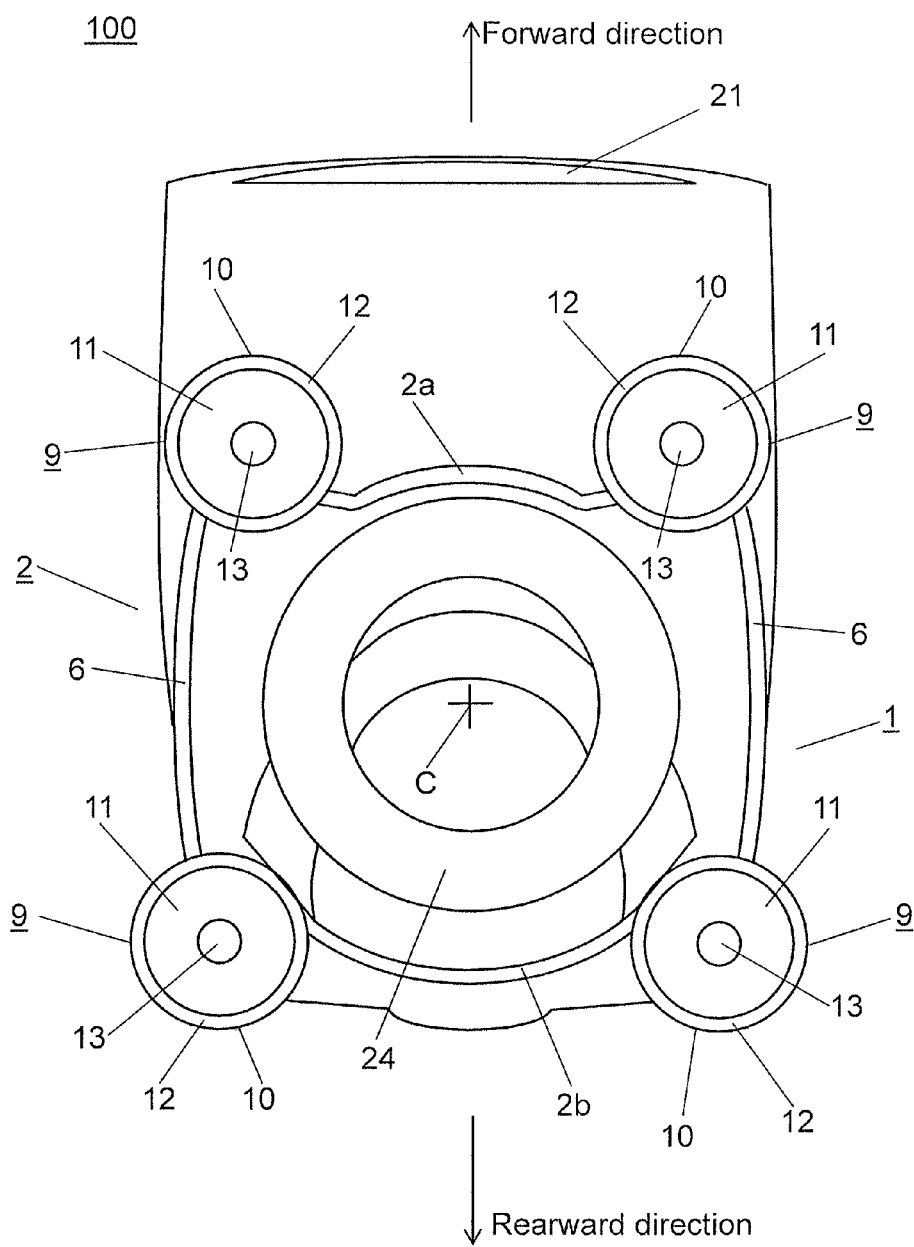

STAND FOR STROBE AND ILLUMINATION DEVICE EQUIPPED WITH SAME

This application is a U.S. National Phase Application of PCT International Application PCT/JP2013/001044.

TECHNICAL FIELD

The present invention relates to a strobe stand in which the illumination range of light emission of a flash discharge tube is controlled, and to an illumination device equipped with the strobe stand.

BACKGROUND ART

In order to expand photographic uses, a conventional, simple strobe stand for wireless use is disclosed (see Patent Literature 1, for example).

The strobe stand disclosed in Patent Literature 1 is formed of one planar plate member that has three support-leg parts. The top surface of the plate member is provided with a strobe device attachment section. Three support legs are disposed in the positions of the vertexes (tips) of the three support-leg parts that form an equilateral triangle on the bottom surface of the plate member. Rubber non-slip members are fixed to the bottom surfaces of the support legs, allowing the strobe stand to be installed on a supporting surface.

However, the strobe stand disclosed in Patent Literature 1 cannot adhere closely to the supporting surface for fixation thereto. Thus, when the light-emitting part of the strobe device is rotated for bounce illumination, the strobe stand can be displaced from the intended installation position.

Generally, in the strobe device mounted on the strobe stand, the illumination angle can be changed to a desired angle for bounce illumination, according to the intension of a photographer. However, the bounce position is manually set, and thus when the photographing timing is bad, the photographer can miss a photo opportunity. The effect of vibrations and swings may cause the strobe device mounted on the strobe stand to move from the installation position. Thus, stable light distribution characteristics of the strobe device cannot be obtained.

CITATION LIST

Patent Literature

PTL1 Japanese Utility Model Unexamined Publication No. H04-130937

SUMMARY OF THE INVENTION

In order to address the above problem, the present invention provides a strobe stand on which a strobe device is mounted. The strobe device includes a strobe body and a light-emitting housing coupled to the strobe body. The strobe stand of the present invention includes the following elements:
a base plate including a leg;
an attachment section provided on one surface of the base plate for receiving the strobe device; and
a suction pad provided on the leg on the other surface of the base plate.
With this configuration, the suction pad of the strobe stand can adhere closely to the supporting surface for fixation thereto. As a result, this configuration allows an illumination device including the strobe device to be fixed to an intended installation position, thereby providing stable light distribution characteristics. Further, the strobe stand can also be installed in a place on a supporting surface other than a plane and a gently inclined surface.

An illumination device of the present invention includes the following elements:
a strobe device including the following elements:
a strobe body;
a light-emitting housing coupled to the strobe body;
a bounce mechanism for rotating the light-emitting housing; and
a driver coupled to the bounce mechanism and moving the light-emitting housing in the horizontal direction and in the vertical direction; and
the strobe stand for receiving the strobe device.
With this configuration, the illumination angle of the strobe device can be automatically changed to a predetermined angle for bounce illumination, according to the intention of a photographer. As a result, the photographer can photograph a subject, for example, without missing a photo opportunity. Further, the strobe stand can be positioned stably. Thus, an illumination device having excellent light distribution characteristics can be implemented.

BRIEF DESCRIPTION OF DRAWINGS

FIG. 2 is a bottom view of the illumination device in accordance with the exemplary embodiment.

FIG. 7 is a bottom view of a strobe stand in accordance with another example of the exemplary embodiment.

DESCRIPTION OF EMBODIMENT

Hereinafter, a description is provided for a strobe stand and an illumination device that includes a strobe device equipped with the strobe stand in accordance with an exemplary embodiment of the present invention with reference to the accompanying drawings. The present invention is not limited by the exemplary embodiment.

Exemplary Embodiment

Hereinafter, a description is provided for a strobe stand, and an illumination device that includes a strobe device equipped with the strobe stand in accordance with the exemplary embodiment of the present invention with reference to FIGS. 1A through 3C.

Figure 1A:
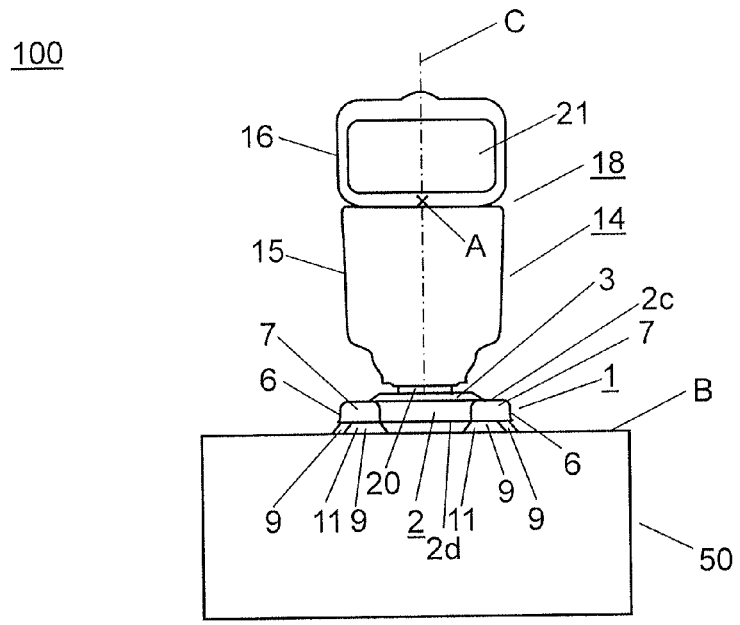
FIG. 1A is a front view of an illumination device in accordance with an exemplary embodiment of the present invention.
Figure 1B:
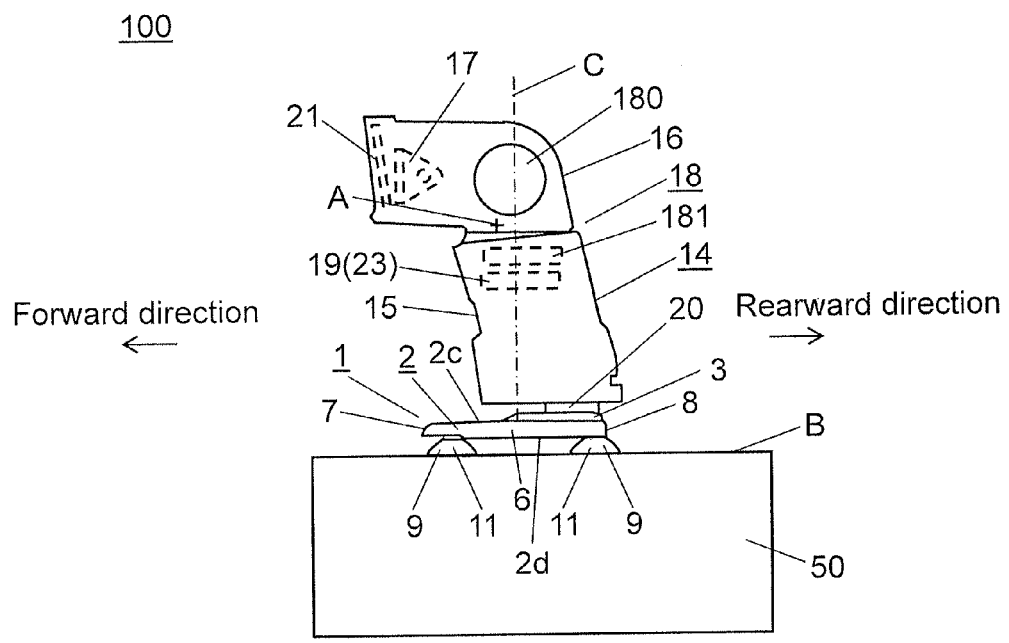
FIG. 1B is a side view of the illumination device in accordance with the exemplary embodiment.
Figure 3A:
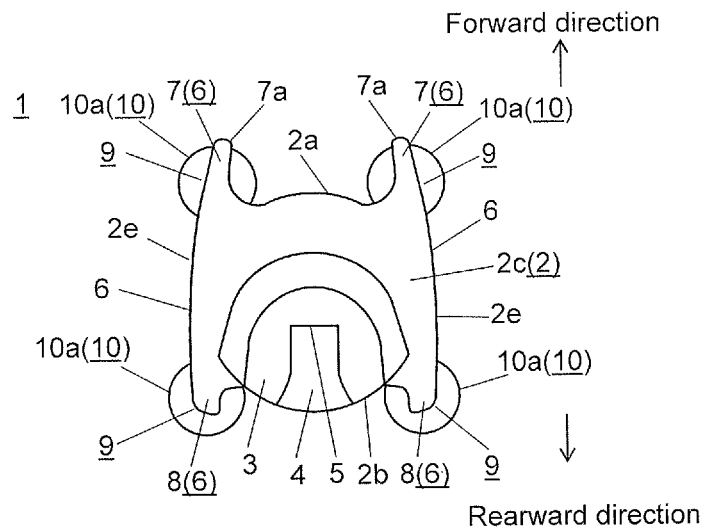
FIG. 3A is a plan view of a strobe stand in accordance with the exemplary embodiment.
Figure 3B:
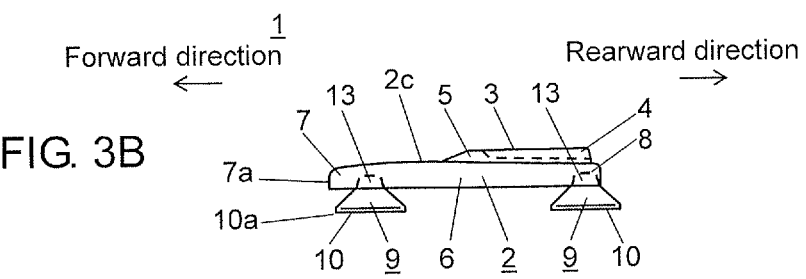
FIG. 3B is a side view of the strobe stand in accordance with the exemplary embodiment.
Figure 3C:
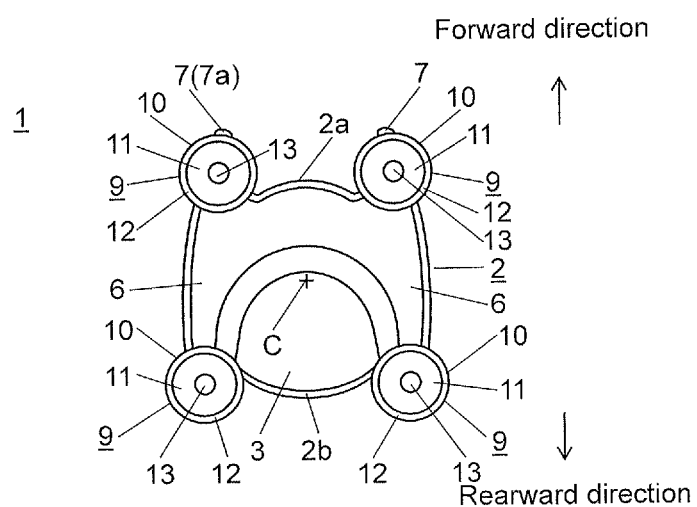
FIG. 3C is a bottom view of the strobe stand in accordance with the exemplary embodiment.

FIG. 1A is a front view of the illumination device in accordance with the exemplary embodiment of the present invention. FIG. 1B is a side view of the illumination device in accordance with the exemplary embodiment. FIG. 2 is a bottom view of the illumination device in accordance with the exemplary embodiment. FIG. 3A is a plan view of the strobe stand in accordance with the exemplary embodiment. FIG. 3B is a side view of the strobe stand in accordance with the exemplary embodiment. FIG. 3C is a bottom view of the strobe stand in accordance with the exemplary embodiment.

As shown in FIG. 1A through FIG. 3C, strobe stand 1 of the exemplary embodiment is formed of at least base plate 2 that is in a substantially planar shape (including planar shape) and includes legs 6; attachment section 3 on which strobe body 15 of strobe device 14 is mounted; and suction pads 9. Legs 6 of base plate 2 are disposed in the front and rear and right and left positions. Suction pads 9 of strobe stand 1 are disposed on four legs 6, for example, provided in the front and rear and right and left positions on other surface 2d of base plate 2. The number of legs 6 is not limited to four.

As shown in FIG. 3A, attachment section 3 of strobe stand 1 is formed of notch 4 and fitting recess 5 communicating with notch 4, and is provided on the rear side of one surface 2c of base plate 2. The top surface of attachment section 3 is formed flat so as to support strobe device 14 horizontally.

Fitting protrusion 20 (to be described later) of strobe body 15 of strobe device 14 to be projected upward is inserted into and removed from fitting recess 5 of attachment section 3 via notch 4 of attachment section 3. Thereby, the fitting protrusion fits into fitting recess 5 and strobe device 14 is mounted on attachment section 3 of strobe stand 1. With this configuration, as shown in FIG. 3C, rotating center axis C of strobe device 14 in the horizontal direction is disposed at the center position of the straight line that connects the centers of a pair of right and left straight lines connecting front and rear suction pads 9 of strobe stand 1.

As shown in FIG. 2, on the front side of base plate 2, small arc portion 2a is formed so as to protrude forward. On the rear side of base plate 2, large arc portion 2b is formed so as to protrude rearward. This configuration can secure the space for placing a vibration-proof sheet, for example, which will be described later.

As shown in FIG. 3A through FIG. 3C, legs 6 include front legs 7 extending forward and rear legs 8 extending rearward. Front legs 7 are formed so as to extend slightly longer than rear legs 8 and are disposed more inward. That is, the legs extend such that the space between front legs 7 is smaller than the space between rear legs 8. Further, outer edges 2e of base plate 2 connecting front legs 7 and rear legs 8 are formed so as to be gently curved inward in the concave shape toward the front side. This configuration can enhance the mechanical strength of the strobe stand.

As shown in FIG. 3A through FIG. 3C, each suction pad 9 has body 10 that is in a substantially conical shape (including a conical shape) and is open with a diameter increasing toward edge 10a of the outer periphery of the body; adhesive surface 11 formed inside body 10; and support 13 in the shape of a pillar, for example, projecting at the center of body 10 on the opposite side of opening 12 of body 10. Supports 13 of suction pads 9 are inserted into holders (not shown) of front legs 7 and rear legs 8. Thus, suction pads 9 are disposed on legs 6 of base plate 2. At this time, suction pad 9 on front leg 7 is disposed such that edge 10a of the outer periphery (the periphery of opening 12) of body 10 of suction pad 9 is positioned at substantially edge 7a of front leg 7. In contrast, suction pad 9 on rear leg 8 is disposed such that the center of rear leg 8 corresponds to the center of suction pad 9. That is, suction pads 9 are disposed on the circumference of rotating center axis C of strobe device 14 in the horizontal direction and in positions away from rotating center axis C. In installation of strobe stand 1 on which strobe device 14 is mounted, the above configuration can enhance the stability.

Hereinafter, a description is provided for the strobe device of the exemplary embodiment with reference to FIG. 1A through FIG. 2.

As shown in FIG. 1A through FIG. 2, strobe device 14 of the exemplary embodiment includes at least strobe body 15, light-emitting housing 16, bounce mechanism 18, and driver 19. Light-emitting housing 16 is rotatably coupled to strobe body 15 and houses flash discharge tube 17. Light-emitting housing 16 radiates light emitted from flash discharge tube 17 toward an external subject. Bounce mechanism 18 enables light-emitting housing 16 to be rotatable in the horizontal direction and in the vertical direction. Driver 19 is coupled to bounce mechanism 18 and moves light-emitting housing 16 in the horizontal direction and in the vertical direction. In the above description, bounce mechanism 18 is capable of rotating light-emitting housing 16 in the horizontal direction and in the vertical direction. However, the present invention is not limited by this configuration. Bounce mechanism 18 may enable light-emitting housing 16 to be rotatable either in the horizontal direction or in the vertical direction. Alternatively, bounce mechanism 18 may enable light-emitting housing 16 to be rotatable around the rotating center axis that is in the same direction as that of the optical axis of the strobe light emitted from light-emitting housing 16.

Strobe body 15 of strobe device 14 is formed of a casing in the shape of a vertically oriented substantially rectangular column (including a rectangular column), for example. Light-emitting housing 16 is rotatably coupled to the top surface side of strobe body 15. Fitting protrusion 20 is formed on the bottom surface side of strobe body 15. Fitting protrusion 20 of strobe device 14 is fitted into fitting recess 5 of strobe stand 1. Thereby, strobe device 14 is mounted on strobe stand 1, and illumination device 100 is formed.

Light-emitting housing 16 of strobe device 14 is formed in the shape of a horizontally oriented rectangular column (including a rectangular column), for example. The light-emitting housing includes, on one surface thereof, illumination surface 21 for radiating the light emitted from flash discharge tube 17 to a subject.

With this configuration, as shown in FIG. 1A and FIG. 1B, the center of gravity A of strobe device 14 is disposed on the top front part of strobe body 15 (between rotating center axis C of light-emitting housing 16 in the horizontal direction and suction pads 9 on front legs 7). At this time, suction pads 9 are disposed outside the rotational locus of the position of the center of gravity A of light-emitting housing 16 when light-emitting housing 16 rotates in the horizontal direction. When strobe device 14 is mounted on attachment section 3 on the rear side of strobe stand 1, the center of gravity A of strobe device 14 is in the position slightly nearer to the front side of strobe stand 1. Thus, four suction pads 9 in the front and rear and right and left positions outside the position of center of gravity A of strobe device 14 adhere closely to supporting surface B of base 50, and thereby strobe device 14 can be supported stably.

Hereinafter, a description is provided for bounce mechanism 18 and driver 19 of the strobe device of the exemplary embodiment, with reference to FIG. 1A and FIG. 1B, using FIG. 4A and FIG. 4B.

Figure 4A:
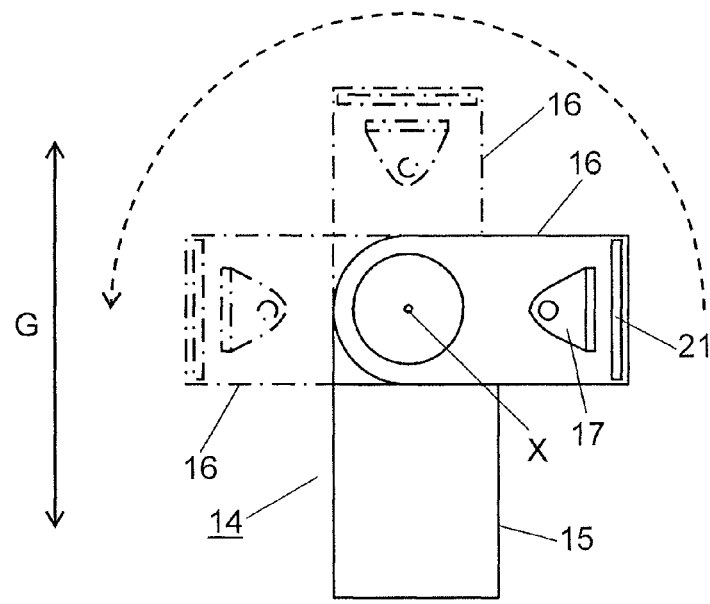
FIG. 4A is a schematic diagram showing a state where a light-emitting housing of a strobe device is rotated in a vertical direction for bounce illumination in accordance with the exemplary embodiment.

FIG. 4A is a schematic diagram showing a state where the light-emitting housing of the strobe device is rotated in the vertical direction for bounce illumination in accordance with the exemplary embodiment. FIG. 4B is a schematic diagram showing a state where the light-emitting housing of the strobe device is rotated in the horizontal direction for bounce illumination in accordance with the exemplary embodiment.

Figure 4B:
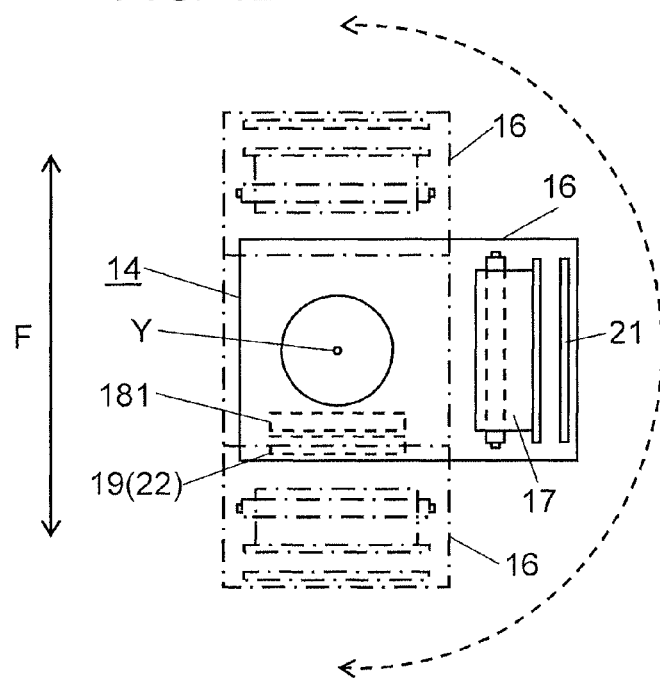
FIG. 4B is a schematic diagram showing a state where the light-emitting housing of the strobe device is rotated in a horizontal direction for bounce illumination in accordance with the exemplary embodiment.

As shown in FIG. 4A and FIG. 4B, bounce mechanism 18 of the strobe device is formed of vertical-direction variable mechanism 180 and horizontal-direction variable mechanism 181. The bounce mechanism rotatably couples strobe body 15 and light-emitting housing 16 of strobe device 14. Specifically, vertical-direction variable mechanism 180 of bounce mechanism 18 is rotatable in vertical direction G around transverse shaft X provided along the width direction (horizontal direction) of strobe body 15. In contrast, horizontal-direction variable mechanism 181 of bounce mechanism 18 is rotatable in horizontal direction F around longitudinal shaft Y provided along the height direction (vertical direction) of strobe body 15.

At this time, as shown in FIG. 4A, vertical-direction variable mechanism 180 of bounce mechanism 18 is provided as follows. The angles in vertical direction G of light-emitting housing 16 cover the angles from the normal illumination angle (the angle when light-emitting housing 16 is in the normal photographing position) to a desired illumination angle (the angle when light-emitting housing 16 is in the bounce photographing position), which is different from the normal illumination angle set by the user. Specifically, vertical-direction variable mechanism 180 has a rotation angle of 180 degrees in vertical direction G, for example. Similarly, as shown in FIG. 4B, horizontal-direction variable mechanism 181 of bounce mechanism 18 has a rotation angle of 180 degrees in right and left direction (horizontal direction F), for example.

As shown in FIG. 1B and FIG. 4B, driver 19 has vertical-direction driver 22 for driving vertical-direction variable mechanism 180 of bounce mechanism 18 and horizontal-direction driver 23 for driving horizontal-direction variable mechanism 181 of bounce mechanism 18. Vertical-direction driver 22 is formed of a vertical-direction driving motor for rotating vertical-direction variable mechanism 180 of bounce mechanism 18 in vertical direction G. In contrast, horizontal-direction driver 23 is formed of a horizontal-direction driving motor for rotating horizontal-direction variable mechanism 181 of bounce mechanism 18 in horizontal direction F.

Hereinafter, a description is provided for a use mode of strobe stand 1 and illumination device 100 of the exemplary embodiment, with reference to FIG. 1A and FIG. 1B, using FIG. 5A and FIG. 5B.

Figure 5A:
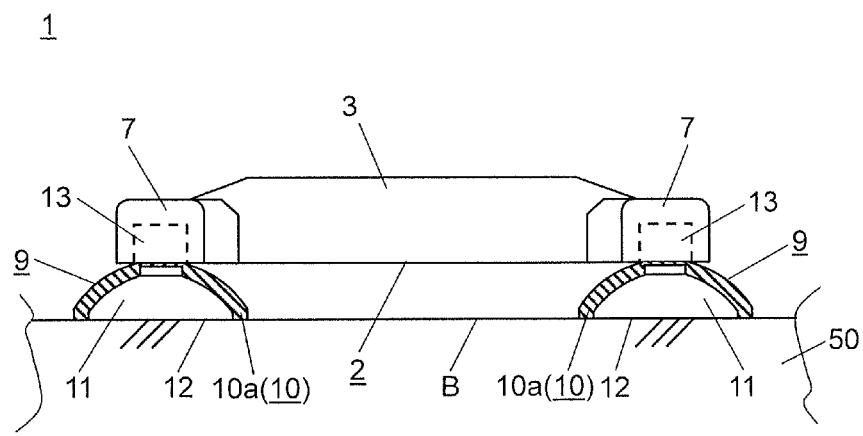
FIG. 5A is a diagram showing a state before adhesion of suction pads of the strobe stand in accordance with the exemplary embodiment.

FIG. 5A is a diagram showing a state before adhesion of suction pads of the strobe stand in accordance with the exemplary embodiment. FIG. 5B is a diagram showing a state after adhesion of suction pads of the strobe stand in accordance with the exemplary embodiment.

First, as shown in FIG. 1A and FIG. 1B, fitting protrusion 20 of strobe device 14 is fitted into fitting recess 5 of strobe stand 1, and thereby strobe device 14 is mounted on strobe stand 1. Thus, illumination device 100 is formed.

Then, strobe stand 1 of illumination device 100 is installed on the horizontal top surface (hereinafter referred to as "supporting surface B") of base 50.

At this time, as shown in FIG. 5A, strobe stand 1 is placed such that adhesive surfaces 11 of suction pads 9 of the strobe stand face supporting surface B of base 50.

Figure 5B:
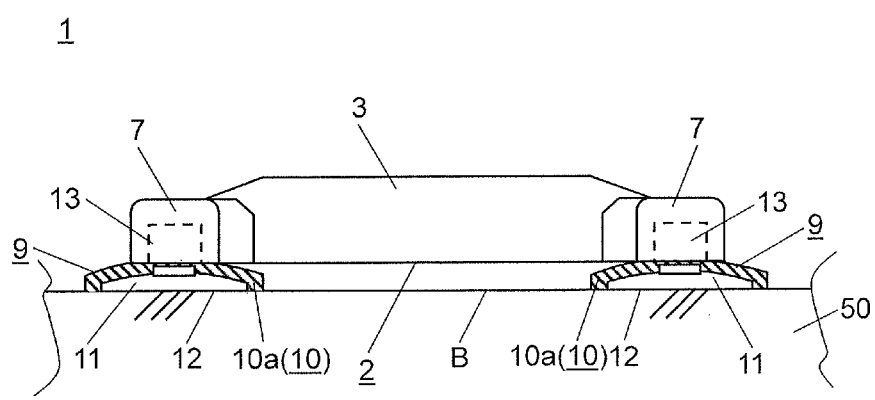
FIG. 5B is a diagram showing a state after adhesion of suction pads of the strobe stand in accordance with the exemplary embodiment.

Next, as shown in FIG. 5B, suction pads 9 are pressed toward supporting surface B of base 50 via strobe stand 1. At this time, as each suction pad 9 is pressed, the increase in the diameter of edge 10a enlarges opening 12, and the air inside adhesive surface 11 of suction pad 9 is pushed to the outside. When the pressure inside adhesive surface 11 of suction pad 9 becomes a negative pressure state with respect to the external pressure (atmospheric pressure), adhesive surface 11 of suction pad 9 closely adheres to supporting surface B. Thereby, suction pads 9 of strobe stand 1 adhere closely to base 50 for fixation thereto, which prevents the front and rear and right and left movement. As a result, strobe device 14 fixed to strobe stand 1 is securely fixed to supporting surface B of base 50, and displacement from the intended installation position is prevented. This configuration can provide excellent light distribution characteristics from strobe device 14 of illumination device 100 to a subject.

Next, in the state where illumination device 100 is fixed in position as described above, the angle of light-emitting housing 16 of strobe device 14 is adjusted in the horizontal direction and in the vertical direction into a desired illumination angle automatically, for example, by bounce mechanism 18. When there is a sufficient time before the photographing timing, setting may be made manually.

When light-emitting housing 16 of strobe device 14 rotates in the horizontal direction and in the vertical direction, the above configuration can prevent the movement of strobe device 14 with respect to supporting surface B that is caused by the centrifugal force of light-emitting housing 16. This can ensure the accuracy of position in the bounce angle of light-emitting housing 16 of strobe device 14 in illumination device 100.

That is, in strobe device 14 of illumination device 100, the illumination angle of strobe light can be accurately changed to a predetermined angle for bounce illumination, according to the intention of a photographer. Thus, the photographer can photograph a subject, for example, without missing a photo opportunity.

Hereinafter, a description is provided for a strobe stand and an illumination device that includes a strobe device equipped with the strobe stand, in accordance with another example of the exemplary embodiment, with reference to FIG. 6A through FIG. 9D.

Figure 6A:
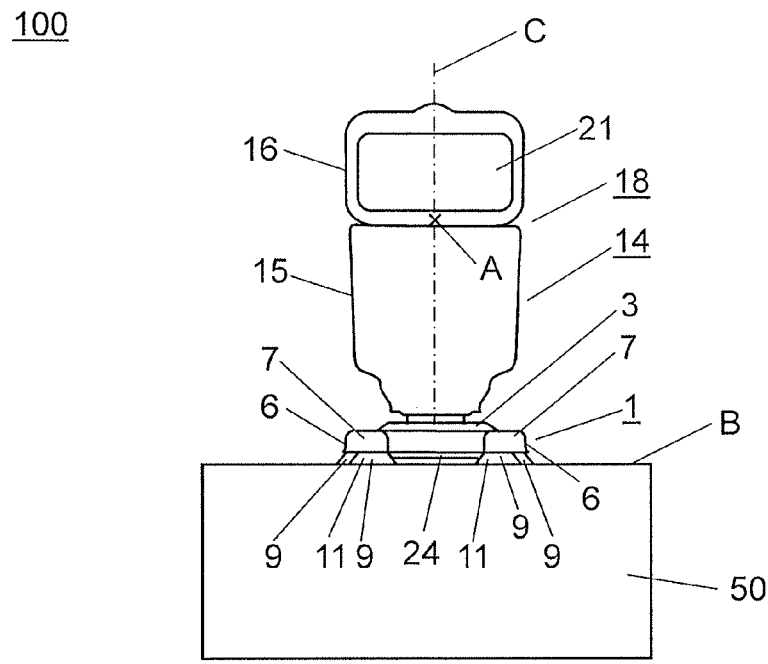
FIG. 6A is a front view of an illumination device in accordance with another example of the exemplary embodiment.
Figure 6B:
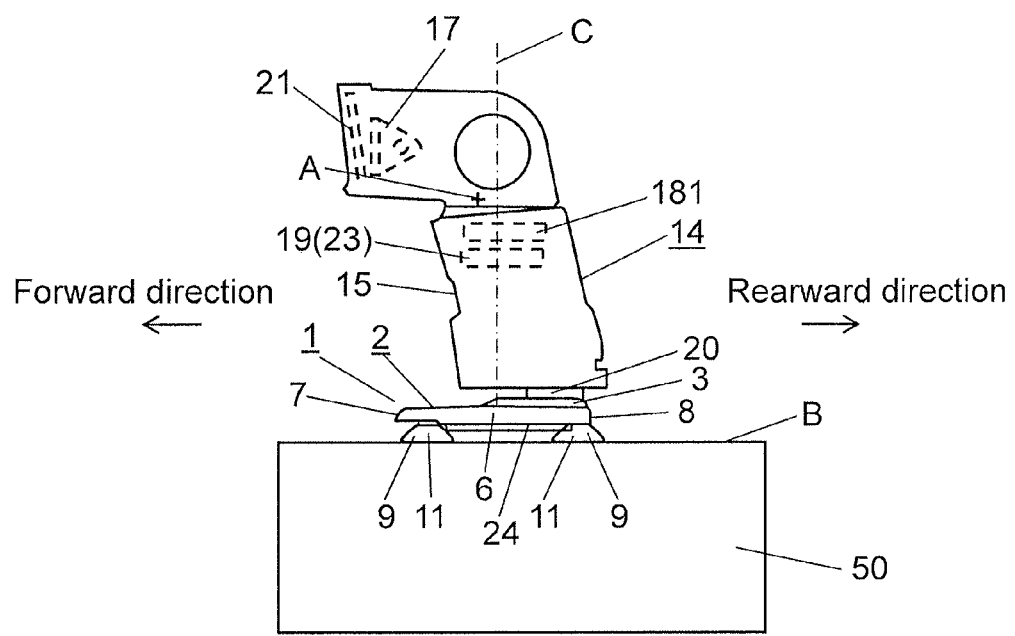
FIG. 6B is a side view of the illumination device in accordance with another example of the exemplary embodiment.
Figure 8A:
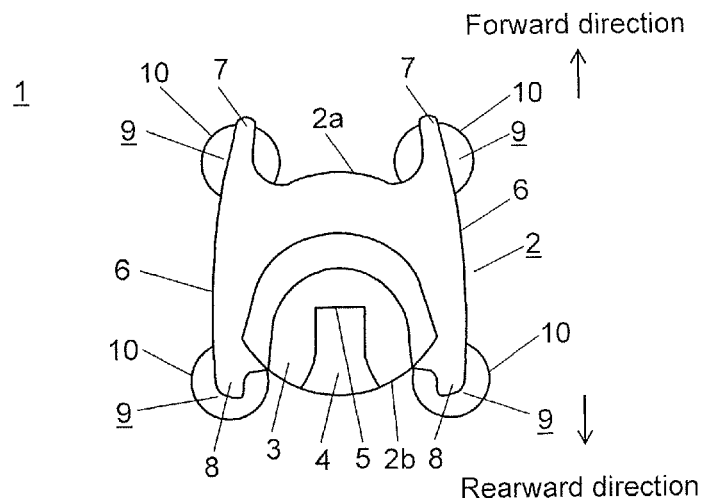
FIG. 8A is a plan view of the strobe stand in accordance with another example of the exemplary embodiment.
Figure 8B:
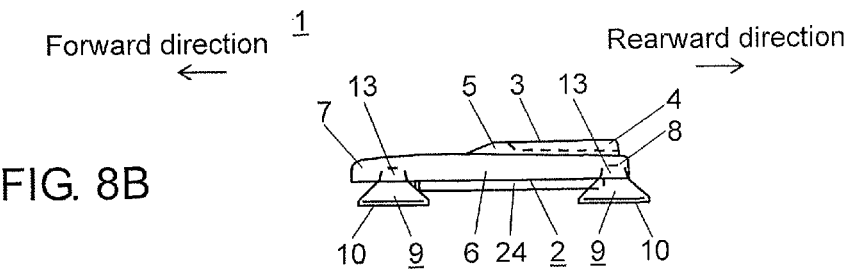
FIG. 8B is a side view of the strobe stand in accordance with another example of the exemplary embodiment.
Figure 8C:
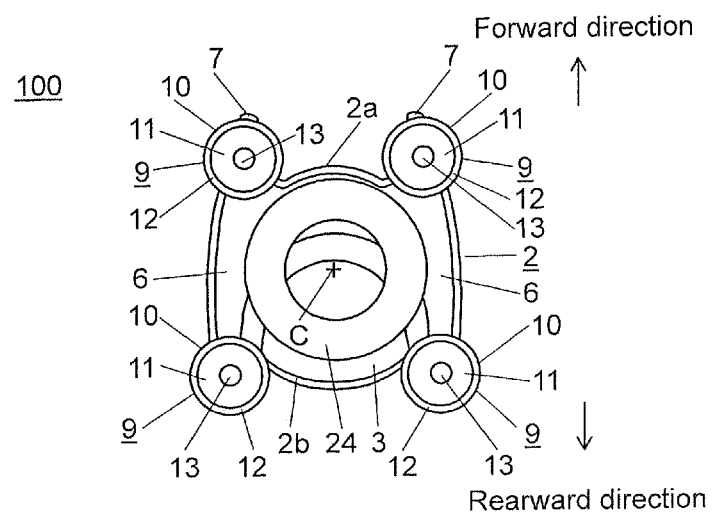
FIG. 8C is a bottom view of the strobe stand in accordance with another example of the exemplary embodiment.

FIG. 6A is a front view of an illumination device in accordance with another example of the exemplary embodiment. FIG. 6B is a side view of the illumination device in accordance with another example of the exemplary embodiment. FIG. 7 is a bottom view of a strobe stand in accordance with another example of the exemplary embodiment. FIG. 8A is a plan view of the strobe stand in accordance with another example of the exemplary embodiment. FIG. 8B is a side view of the strobe stand in accordance with another example of the exemplary embodiment. FIG. 8C is a bottom view of the strobe stand in accordance with another example of the exemplary embodiment.

Strobe stand 1 of another example of the exemplary embodiment is different from strobe stand 1 of the exemplary embodiment described earlier in that a vibration-proof sheet is provided on the bottom surface of base plate 2. In this example, the configuration, action, and advantage of the illumination device that includes strobe stand 1 and strobe device 14 are identical with those of the exemplary embodiment except for the vibration-proof sheet, and thus the description thereof is omitted.

That is, as shown in FIG. 6A through FIG. 8C, in strobe stand 1 of another example of the exemplary embodiment, vibration-proof sheet 24 in an annular shape or a ring shape, for example, is disposed between rotating center axis C of light-emitting housing 16 in the horizontal direction and suction pads 9 along the circumferential direction with respect to rotating center axis C of light-emitting housing 16. At this time, vibration-proof sheet 24 is brought into contact with supporting surface B of base 50 by pressing suction pads 9 of strobe stand 1, and thereafter deformed to have a smaller thickness by further pressing. For this purpose, vibration-proof sheet 24 has a thickness to be deformed to an extent such that adhesive surfaces 11 of suction pads 9 closely adhere to supporting surface B.

That is, the synergistic effect of the vibration-proof action of vibration-proof sheet 24 and the adhesive action of suction pads 9 can prevent displacement of strobe device 14 of illumination device 100 from the installation position even when swings or vibrations occur in bounce operation of light-emitting housing 16 of strobe device 14.

Hereinafter, a description is provided for a use mode of strobe stand 1 and illumination device 100 of another example of the exemplary embodiment, with reference to FIG. 6A and FIG. 6B, using FIG. 9A through FIG. 9D.

Figure 9A:
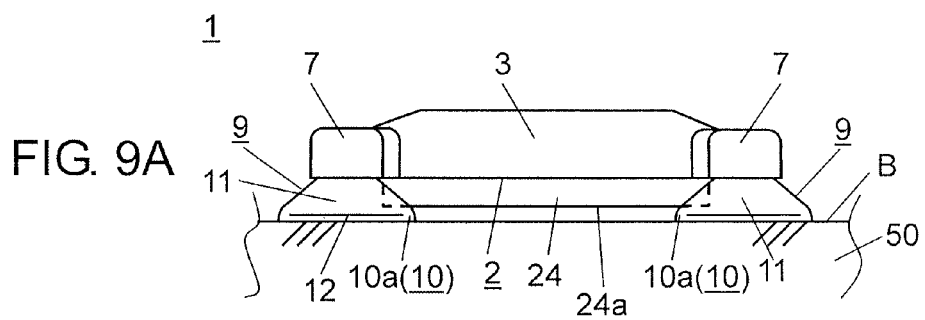
FIG. 9A is a diagram showing a state before suction pads and a vibration-proof sheet are installed on a supporting surface in the strobe stand in accordance with another example of the exemplary embodiment.
Figure 9B:
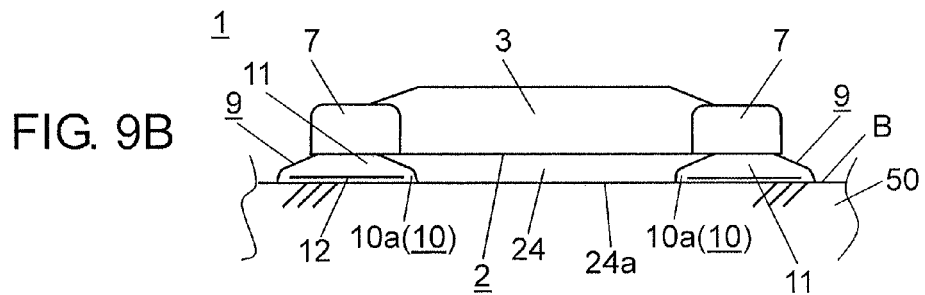
FIG. 9B is a diagram showing a state where the suction pads are pressed and the vibration-proof sheet is in contact with the supporting surface in the strobe stand in accordance with another example of the exemplary embodiment.
Figure 9C:
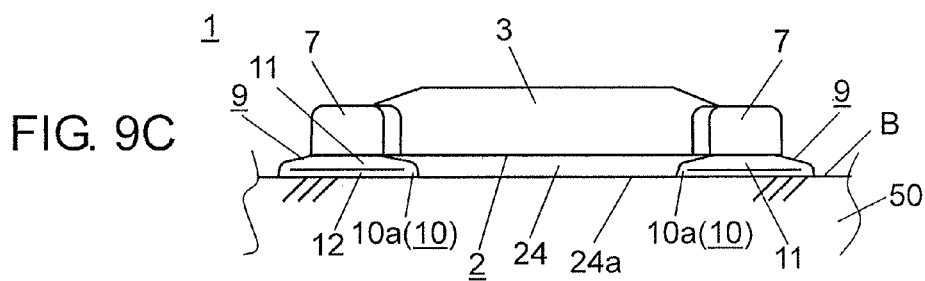
FIG. 9C is a diagram showing a state where further pressing the suction pads deforms the vibration-proof sheet in the strobe stand in accordance with another example of the exemplary embodiment.
Figure 9D:
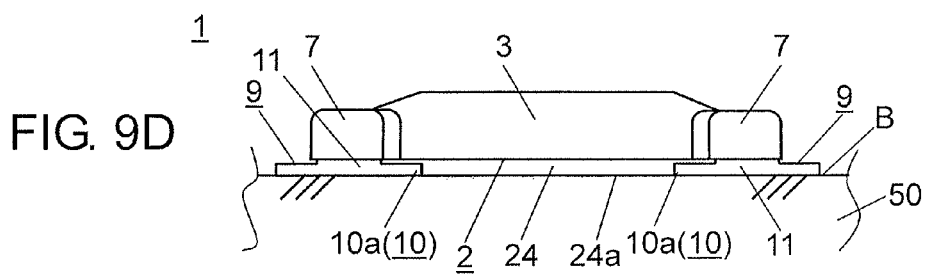
FIG. 9D is a diagram showing a state where the vibration-proof sheet is deformed and thereafter the suction pads adhere to the supporting surface in the strobe stand in accordance with another example of the exemplary embodiment.

FIG. 9A is a diagram showing a state before suction pads and a vibration-proof sheet of the strobe stand are installed on a supporting surface in accordance with another example of the exemplary embodiment. FIG. 9B is a diagram showing a state where the suction pads are pressed and the vibration-proof sheet is in contact with the supporting surface in the strobe stand in accordance with another example of the exemplary embodiment. FIG. 9C is a diagram showing a state where further pressing the suction pads deforms the vibration-proof sheet in the strobe stand in accordance with another example of the exemplary embodiment. FIG. 9D is a diagram showing a state where the vibration-proof sheet is deformed and thereafter the suction pads adhere to the supporting surface in the strobe stand in accordance with of another example the exemplary embodiment.

First, as shown in FIG. 6A and FIG. 6B, fitting protrusion 20 of strobe device 14 is fitted into fitting recess 5 of strobe stand 1, and thereby strobe device 14 is mounted on strobe stand 1. Thus, illumination device 100 is formed.

Then, strobe stand 1 of illumination device 100 is installed on the horizontal top surface (hereinafter referred to as "supporting surface B") of base 50.

At this time, as shown in FIG. 9A, strobe stand 1 is placed such that adhesive surfaces 11 of suction pads 9 and bottom surface 24a of vibration-proof sheet 24 face supporting surface B of base 50.

Next, as shown in FIG. 9B, suction pads 9 are pressed toward supporting surface B of base 50 via strobe stand 1. At this time, bottom surface 24a of vibration-proof sheet 24 makes contact with supporting surface B of base 50.

As shown in FIG. 9C, as each suction pad 9 is pressed, the increase in the diameter of edge 10a enlarges opening 12, and the air inside adhesive surface 11 of suction pad 9 is pushed to the outside. At this time, vibration-proof sheet 24 is deformed so as to have a smaller thickness.

Thereafter, as shown in FIG. 9D, when the pressure inside suction pad 9 becomes a negative pressure state with respect to the external pressure (atmospheric pressure), adhesive surface 11 of suction pad 9 and vibration-proof sheet 24 closely adhere to supporting surface B of base 50. Thereby, suction pads 9 and vibration-proof sheet 24 in strobe stand 1 are deformed and closely adhere to base 50 for fixation thereto. This phenomenon prevents front and rear and right and left movement and absorbs vibrations, for example. As a result, strobe device 14 fixed to strobe stand 1 is securely fixed to supporting surface B of base 50, which prevents displacement of strobe stand 1 from the intended installation position. This configuration can provide excellent light distribution characteristics from strobe device 14 of illumination device 100 to a subject.

The strobe stand and the illumination device that includes the strobe device equipped with the strobe stand of the present invention are not limited by the exemplary embodiment and various modifications can be made without departing from the true spirit and the scope of the present invention.

Figure 10:
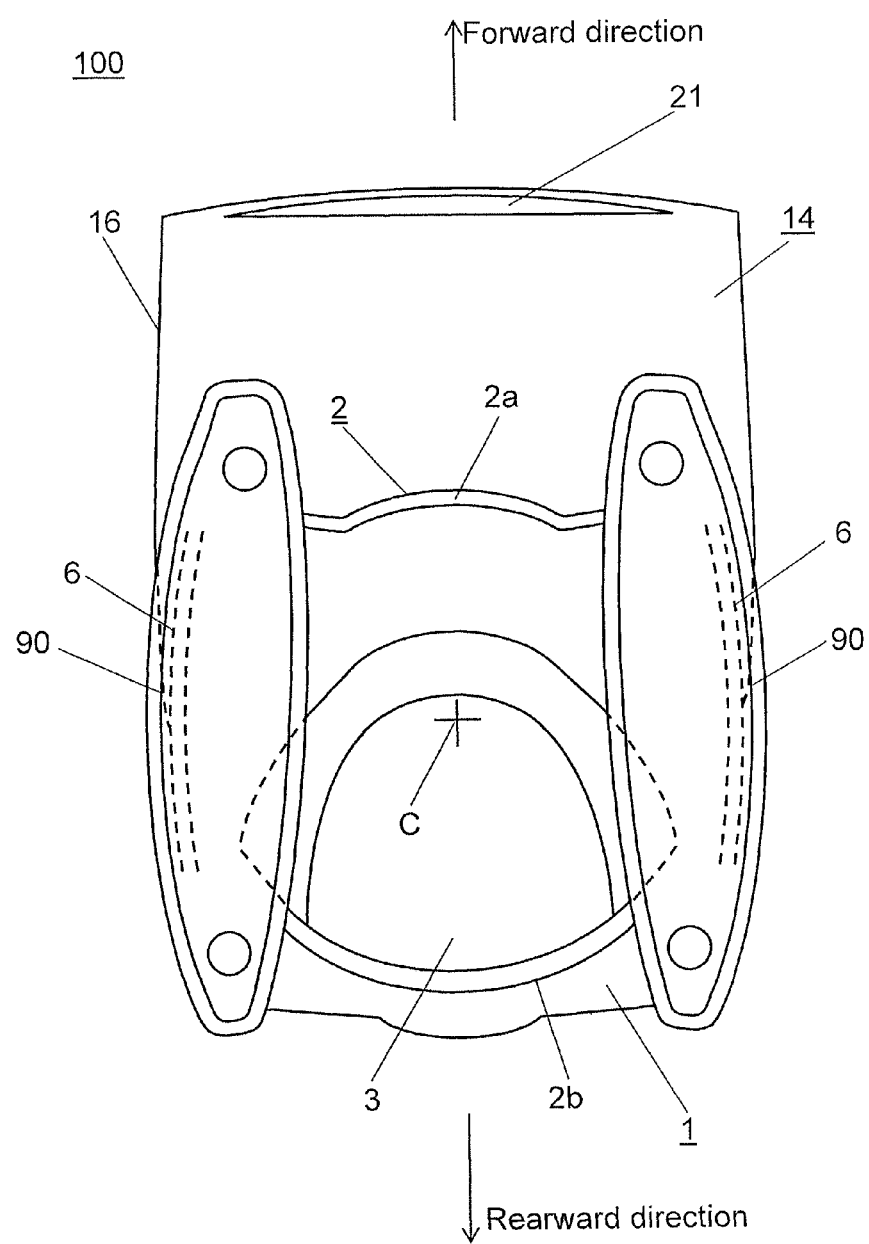
FIG. 10 is a diagram showing suction pads of a strobe stand in accordance with still another example of the exemplary embodiment.

In the exemplary embodiment, an example of using suction pads 9 each in a conical shape is described. However, this example is not intended to limit the present invention. For instance, as shown in FIG. 10, suction pads 90 each in a substantially oval shape (including an oval shape) may be disposed such that the major axis thereof corresponds to legs 6 in the front and rear direction of strobe stand 1. Alternatively, suction pads each in a substantially oval shape (including an oval shape) may be disposed such that the major axis thereof corresponds to the legs in the right and left direction of strobe stand 1. With such a configuration, adhesive surfaces 11 of suction pads 9 can adhere more closely to supporting surface B of base 50 for fixation thereto. As a result, strobe device 14 fixed to strobe stand 1 can be securely fixed to supporting surface B of base 50, and thus the displacement from the intended installation position can be prevented.

In the exemplary embodiment, an example of using ring-shaped vibration-proof sheet 24 is described. However, this example is not intended to limit the present invention. For instance, a plurality of sheets may be scattered along the circumferential direction. This configuration can downsize a strobe stand and enhance flexibility of design and shape.

In the exemplary embodiment, an example of using suction pads 9 each in a substantially conical shape is described. However, this example is not intended to limit the present invention. For instance, a tab (not shown) may be projected from the external surface of the periphery of opening 12 of suction pad 9. In this case, when the tab of suction pad 9 is pinched and pulled up in the state where suction pad 9 is closely adhered to supporting surface B of base 50, part of suction pad 9 is peeled from supporting surface B. This configuration enables the whole part of suction pad 9 to be easily peeled from supporting surface B of base 50. As a result, the illumination device can be installed more easily.

As described above, the present invention provides a strobe stand on which a strobe device is mounted. The strobe device includes a strobe body and a light-emitting housing coupled to the strobe body. The strobe stand of the present invention includes the following elements:

a base plate including a leg;

an attachment section provided on one surface of the base plate for receiving a strobe device; and a suction pad provided on the leg on the other surface of the base plate.

With this configuration, the suction pad of the strobe stand can closely adhere to the supporting surface for fixation thereto. As a result, this configuration allows the strobe device to be fixed to an intended installation position, thereby providing stable light distribution characteristics. Further, the strobe stand can also be installed in a place on a supporting surface other than a plane and a gently inclined surface.

In the strobe stand of the present invention, the suction pad is one of a plurality of suction pads disposed along the circumferential direction with respect to the rotating center axis of the light-emitting housing in the horizontal direction.

This configuration can suppress the displacement caused by the centrifugal force occurring when the light-emitting housing of the strobe device rotates in the horizontal direction. As a result, the bounce angle of the light-emitting housing of the strobe device can be positioned accurately.

In the strobe stand of the present invention, the suction pads are disposed outside the rotational locus of the position of the center of gravity of the light-emitting housing when the light-emitting housing rotates in the horizontal direction.

With this configuration, even when the position of the center of gravity is changed by rotation of the light-emitting housing of the strobe device in the horizontal direction and in the vertical direction, the light-emitting housing can be supported in a stable state. Thus, the bounce angle of the light-emitting housing can be positioned accurately.

The strobe stand of the present invention further includes a vibration-proof sheet disposed between the rotating center axis of the light-emitting housing in the horizontal direction and the suction pads.

With this configuration, even when the light-emitting housing rotates in the horizontal direction and in the vertical direction, the adhesive action of the suction pads and the vibration-proof action of the vibration-proof sheet can suppress movement of the strobe device with respect to the supporting surface and the vibrations from the supporting surface. As a result, this can further enhance the accuracy of position in the bounce angle of the light-emitting housing in the strobe device.

In the strobe stand of the present invention, the vibration-proof sheet is one of a plurality of vibration-proof sheets or an annular vibration-proof sheet disposed along the circumferential direction with respect to the rotating center axis of the light-emitting housing in the horizontal direction.

This configuration can prevent the movement of the strobe device with respect to the supporting surface even when the light-emitting housing of the strobe device rotates horizontally. As a result, this can further enhance the accuracy of position in the bounce angle of the light-emitting housing in the strobe device.

The strobe device of the present invention includes the following elements:

a strobe body;

a light-emitting housing coupled to the strobe body;

a bounce mechanism for rotating the light-emitting housing; and a driver coupled to the bounce mechanism and moving the light-emitting housing in the horizontal direction and in the vertical direction; and the strobe stand for receiving the strobe body.

With this configuration, the illumination angle of the strobe device can be automatically changed to a predetermined angle for bounce illumination, according to the intention of a photographer. As a result, the photographer can photograph a subject, for example, without missing a photo opportunity. Further, the strobe stand can be installed stably, and thus a strobe device having excellent light distribution characteristics can be implemented.

INDUSTRIAL APPLICABILITY

With a strobe stand of the present invention, the bounce angle of the light-emitting housing can be positioned accurately with good timing. Thus, the present invention is also useful for a strobe device to be used for an imaging device required not to miss a photo opportunity, for example.

REFERENCE MARKS IN THE DRAWINGS

1 Strobe stand
2 Base plate
2a Arc portion
2b Arc portion
2c One surface
2d Other surface
2e Outer edge
3 Attachment section
5 Fitting recess
6 Leg
7 Front leg
7a, 10a Edge
8 Rear leg
9, 90 Suction pad
10 Body
11 Adhesive surface
12 Opening
13 Support
14 Strobe device
15 Strobe body
16 Light-emitting housing
17 Flash discharge tube
18 Bounce mechanism
19 Driver
20 Fitting protrusion
21 Illumination surface
22 Vertical-direction driver
23 Horizontal-direction driver
24 Vibration-proof sheet
24a Bottom surface
50 Base
100 Illumination device
180 Vertical-direction variable mechanism
181 Horizontal-direction variable mechanism

The invention claimed is:

1. A strobe stand on which a strobe device is mounted, the strobe device including a strobe body, and a light-emitting housing coupled to the strobe body,
the strobe stand comprising:
a base plate including a leg;
an attachment section provided on one surface of the base plate for receiving the strobe device; and
a suction pad provided on the leg on an other surface of the base plate,
wherein the suction pad is one of a plurality of suction pads disposed along a circumferential direction with respect to a rotating center axis of the light-emitting housing in a horizontal direction.

2. An illumination device comprising:
a strobe device including:
a strobe body;
a light-emitting housing coupled to the strobe body;
a bounce mechanism for rotating the light-emitting housing; and
a driver coupled to the bounce mechanism and moving the light-emitting housing in a horizontal direction and in a vertical direction; and;
the strobe stand of claim 1 for receiving the strobe device.

3. A strobe stand on which a strobe device is mounted, the strobe device including a strobe body, and a light-emitting housing coupled to the strobe body,
the strobe stand comprising:
a base plate including a leg;
an attachment section provided on one surface of the base plate for receiving the strobe device; and
a suction pad provided on the leg on an other surface of the base plate,
wherein the suction pad is disposed outside a rotational locus of a position of a center of gravity of the light-emitting housing when the light-emitting housing rotates in a horizontal direction.

4. An illumination device comprising:
a strobe device including:
a strobe body;
a light-emitting housing coupled to the strobe body;
a bounce mechanism for rotating the light-emitting housing; and
a driver coupled to the bounce mechanism and moving the light-emitting housing in a horizontal direction and in a vertical direction; and;
the strobe stand of claim 3 for receiving the strobe device.

5. A strobe stand on which a strobe device is mounted, the strobe device including a strobe body, and a light-emitting housing coupled to the strobe body,
the strobe stand comprising:
a base plate including a leg;
an attachment section provided on one surface of the base plate for receiving the strobe device;
a suction pad provided on the leg on an other surface of the base plate; and
a vibration-proof sheet disposed between the rotating center axis of the light-emitting housing in a horizontal direction and the suction pad.

6. The strobe stand of claim 5,
wherein the vibration-proof sheet is one of a plurality of vibration-proof sheets or an annular vibration-proof sheet disposed along a circumferential direction with respect to the rotating center axis of the light-emitting housing in the horizontal direction.

7. An illumination device comprising:
a strobe device including:
a strobe body;
a light-emitting housing coupled to the strobe body;
a bounce mechanism for rotating the light-emitting housing; and
a driver coupled to the bounce mechanism and moving the light-emitting housing in a horizontal direction and in a vertical direction; and;
the strobe stand of claim 6 for receiving the strobe device.

8. An illumination device comprising:
a strobe device including:
a strobe body;
a light-emitting housing coupled to the strobe body;
a bounce mechanism for rotating the light-emitting housing; and
a driver coupled to the bounce mechanism and moving the light-emitting housing in a horizontal direction and in a vertical direction; and;
the strobe stand of claim 5 for receiving the strobe device.

* * * * *